United States Patent
Kubo et al.

(10) Patent No.: US 12,176,157 B2
(45) Date of Patent: Dec. 24, 2024

(54) ELECTROLYTIC CAPACITOR AND METHOD FOR PRODUCING THE SAME

(71) Applicant: PANASONIC INTELLECTUAL PROPERTY MANAGEMENT CO., LTD., Osaka (JP)

(72) Inventors: Daisuke Kubo, Osaka (JP); Shumpei Matsushita, Yamaguchi (JP); Kenta Chashiro, Osaka (JP); Hiroyuki Arima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 451 days.

(21) Appl. No.: 17/427,534

(22) PCT Filed: Jan. 29, 2020

(86) PCT No.: PCT/JP2020/003104
§ 371 (c)(1),
(2) Date: Jul. 30, 2021

(87) PCT Pub. No.: WO2020/158780
PCT Pub. Date: Aug. 6, 2020

(65) Prior Publication Data
US 2022/0102082 A1    Mar. 31, 2022

(30) Foreign Application Priority Data

Jan. 31, 2019 (JP) ................. 2019-016514
Jan. 31, 2019 (JP) ................. 2019-016515

(51) Int. Cl.
*H01G 9/15*    (2006.01)
*H01G 9/00*    (2006.01)
(Continued)

(52) U.S. Cl.
CPC ............. *H01G 9/15* (2013.01); *H01G 9/0029* (2013.01); *H01G 9/055* (2013.01); *H01G 9/145* (2013.01); *H01G 9/035* (2013.01)

(58) Field of Classification Search
None
See application file for complete search history.

(56) References Cited

U.S. PATENT DOCUMENTS 4,609,971 A * 9/1986 Shaffer ................. H01G 9/025
427/80
6,310,765 B1 10/2001 Tanahashi et al.
(Continued)

FOREIGN PATENT DOCUMENTS

CN    102169758 A    8/2011
CN    102646515 A    8/2012
(Continued)

OTHER PUBLICATIONS

International Search Report and Written Opinion issued in International Patent Application No. PCT/JP2020/003104, dated Apr. 28, 2020; with partial English translation.
(Continued)

*Primary Examiner* — Eric W Thomas
(74) *Attorney, Agent, or Firm* — Rimon P.C.

(57) ABSTRACT

A method for producing an electrolytic capacitor, the method including steps of: preparing an electrode foil; preparing a first conductive polymer dispersion containing a first conductive polymer component and a first dispersion medium; forming a first conductive polymer layer containing the first conductive polymer component, by applying the first conductive polymer dispersion to a surface of the electrode foil by a coating method, and then at least partially
(Continued)

removing the first dispersion medium; and fabricating a capacitor element, using the electrode foil having the first conductive polymer layer.

19 Claims, 3 Drawing Sheets

(51) Int. Cl.
*H01G 9/055* (2006.01)
*H01G 9/145* (2006.01)
*H01G 9/035* (2006.01)

(56) References Cited

U.S. PATENT DOCUMENTS

| | | | |
|---|---|---|---|
| 2006/0236531 A1* | 10/2006 | Merker | H01G 11/56 |
| | | | 29/746 |
| 2010/0103590 A1* | 4/2010 | Saida | H01G 9/028 |
| | | | 427/80 |
| 2011/0119879 A1 | 5/2011 | Ishimaru | |
| 2011/0211294 A1 | 9/2011 | Ueda | |
| 2012/0212880 A1* | 8/2012 | Ishimaru | H01G 9/028 |
| | | | 427/80 |
| 2014/0198428 A1 | 7/2014 | Yamazaki et al. | |
| 2015/0262754 A1 | 9/2015 | Nagashima et al. | |
| 2016/0217933 A1 | 7/2016 | Ueda | |
| 2016/0379759 A1 | 12/2016 | Matsumoto et al. | |
| 2017/0133159 A1 | 5/2017 | Aoyama et al. | |
| 2017/0148575 A1 | 5/2017 | Tsubaki et al. | |
| 2017/0256362 A1 | 9/2017 | Tsubaki | |
| 2017/0271085 A1 | 9/2017 | Tsubaki et al. | |
| 2018/0047513 A1 | 2/2018 | Uka et al. | |
| 2018/0233292 A1 | 8/2018 | Tsubaki et al. | |

FOREIGN PATENT DOCUMENTS

| | | |
|---|---|---|
| CN | 102768903 A | 11/2012 |
| CN | 104813422 A | 7/2015 |
| CN | 106575578 A | 4/2017 |
| CN | 106663541 A | 5/2017 |
| CN | 107004508 A | 8/2017 |
| CN | 108352254 A | 7/2018 |
| JP | S64-82516 A | 3/1989 |
| JP | H11-219861 A | 8/1999 |
| JP | 2001-60536 A | 3/2001 |
| JP | 2011-109024 A | 6/2011 |
| WO | 2013/024532 A1 | 2/2013 |
| WO | 2015/146070 A1 | 10/2015 |
| WO | 2016/103616 A1 | 6/2016 |
| WO | 2016/174818 A1 | 11/2016 |

OTHER PUBLICATIONS

Chinese Office Action dated Sep. 29, 2022 issued in the corresponding Chinese Patent Application No. 202080011873.6, with partial English translation.
Chinese Office Action dated Jun. 10, 2023 issued in the corresponding Chinese Patent Application No. 202080011873.6, with English translation.
Chinese Office Action dated Oct. 11, 2023 issued in the corresponding Chinese Patent Application No. 202080011873.6, with partial English translation.
Chinese Office Action dated Oct. 24, 2024 issued in the corresponding Chinese Patent Application No. 202310316042.5, with partial English translation.
Chinese Office Action dated Oct. 25, 2024 issued in the corresponding Chinese Patent Application No. 202310315755.X, with partial English translation.

\* cited by examiner

ELECTROLYTIC CAPACITOR AND METHOD FOR PRODUCING THE SAME

CROSS-REFERENCE OF RELATED APPLICATIONS

This application is the U.S. National Phase under 35 U.S.C. § 371 of International Patent Application No. PCT/JP2020/003104, filed on Jan. 29, 2020, which in turn claims the benefit of Japanese Application No. 2019-016514, filed on Jan. 31, 2019 and Japanese Application No. 2019-016515, filed on Jan. 31, 2019, the entire disclosures of which Applications are incorporated by reference herein.

TECHNICAL FIELD

The present invention relates to an electrolytic capacitor and a method for producing the same, specifically to an improvement in ESR characteristics.

BACKGROUND ART

Capacitors used in electronic devices are required to have a large capacity and a low equivalent series resistance (ESR) in a high frequency region. A promising example of a capacitor having a large capacity and a low ESR is an electrolytic capacitor using an electrically conductive polymer, such as polypyrrole, polythiophene, polyfuran, and polyaniline, as a solid electrolyte. Patent Literature 1 discloses immersing an anode foil in a dispersion of an electrically conductive polymer, so that the conductive polymer adheres thereto.

CITATION LIST

Patent Literature

[PTL 1] Japanese Laid-Open Patent Publication No. 2011-109024

SUMMARY OF INVENTION

Technical Problem

With increasing popularity for hybrid cars, recent attention has been paid to a system called mild hybrid, in addition to a system that can be self-propelled by an electric motor only (full-hybrid system). In the mild hybrid system, an alternator which is usually installed in a passenger car is used as an auxiliary motor for the engine. In Europe, the power supply standard LV148 has been established, and the rated voltage of the alternator to be installed in motor vehicles has been changed from 12 V to 48 V. Under such circumstances, development is underway toward the commercialization of the mild hybrid system.

When the alternator is designed to generate a higher voltage, a larger ripple current will flow in an electrolytic capacitor used with the alternator. One effective way to suppress a heat generation associated with the increase in ripple current is to reduce the equivalent series resistance (ESR) of the electrolytic capacitor. The ESR can be reduced by increasing the amount of the conductive polymer. With this method, however, it is difficult to allow a sufficient amount of conductive polymer to adhere onto the capacitor element.

Solution to Problem

A first aspect of the present invention relates to a method for producing an electrolytic capacitor, the method including steps of: preparing an electrode foil; preparing a first conductive polymer dispersion containing a first conductive polymer component and a first dispersion medium; forming a first conductive polymer layer containing the first conductive polymer component, by applying the first conductive polymer dispersion to a surface of the electrode foil by a coating method, and then at least partially removing the first dispersion medium; and fabricating a capacitor element, using the electrode foil having the first conductive polymer layer.

A second aspect of the present invention relates to an electrolytic capacitor, including: a capacitor element including an electrode foil, wherein a conductive polymer layer is formed on the electrode foil, 90% or more area of one principal surface of the electrode foil is covered with the conductive polymer layer, and the conductive polymer layer incudes a first conductive polymer layer containing a first conductive polymer component, and a second conductive polymer layer partially covering the first conductive polymer layer and containing a second conductive polymer component.

Advantageous Effects of Invention

According to the present invention, a lot more conductive polymer can be held on the capacitor element. Therefore, an electrolytic capacitor with low ESR can be obtained.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

According to the present embodiment, a dispersion containing a conductive polymer is applied onto an electrode foil by a coating method in order to allow a lot more conductive polymer to adhere thereto. By doing this, a sufficient amount of conductive polymer component can adhere so as to cover the surface of the electrode foil at least partially. The conductive polymer component adhering in a sufficient amount to the surface of the electrode foil can lower the ESR in the resultant electrolytic capacitor. This can also improve the heat resistance of the electrolytic capacitor. Therefore, the electrolytic capacitor according to the present embodiment is suitably applicable for a product in which a large ripple current flows.

Moreover, as compared to the case of forming a layer by allowing polymerization to proceed on the surface of the electrode foil, by doing as above, it is possible to reduce the amount of impurities in the layer containing a conductive polymer. Therefore, the electrolytic capacitor including this can exhibit a higher withstand voltage.

The electrode foil may be either an anode foil or a cathode foil, and may be both an anode foil and a cathode foil. The anode foil has a dielectric layer at its surface. When the conductive polymer component is applied to a surface of an anode foil, the conductive polymer and the dielectric layer formed at the surface of the anode foil can easily come in contact with each other, and thus the ESR can be further reduced. When the conductive polymer component is applied to a surface of a cathode foil, the self-repair performance of the anode foil is unlikely to be disturbed.

[Method for Producing Electrolytic Capacitor]

An electrolytic capacitor according to the present embodiment can be produced by a method including steps of: preparing an electrode foil; preparing a first conductive polymer dispersion containing a first conductive polymer component and a first dispersion medium; forming a first conductive polymer layer containing the first conductive polymer component, by applying the first conductive polymer dispersion to a surface of the electrode foil by a coating method, and then at least partially removing the first dispersion medium; and fabricating a capacitor element, using the electrode foil having the first conductive polymer layer.

Figure 1:
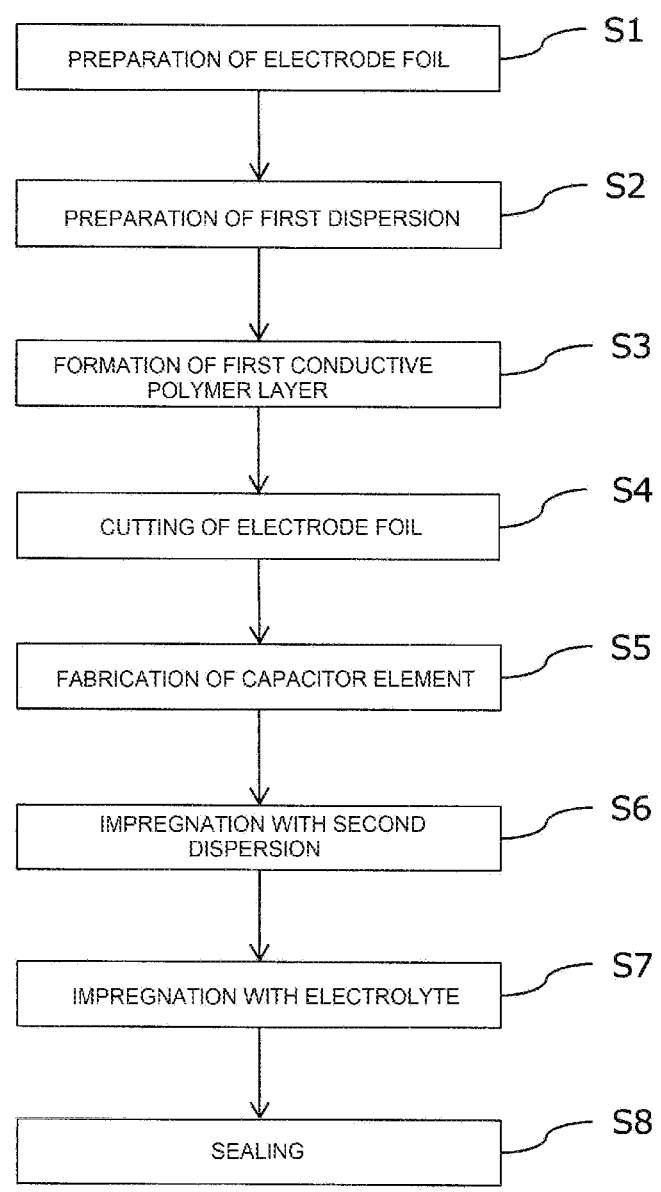
FIG. 1 A flowchart of an example of a production method according to an embodiment of the present invention.

FIG. 1 is a flowchart of an example of a production method according to the present embodiment.

In the following, an example of a method of producing an electrolytic capacitor according to the present embodiment will be described by each step.

(1) Step of Preparing Electrode Foil (S1)

(1-1) Preparation of Anode Foil

In the case of applying the first conductive polymer dispersion to an anode foil, an anode foil is prepared.

The raw material of the anode foil is, for example, a metal foil containing a valve action metal.

The anode foil is prepared by forming a dielectric layer on a surface of the metal foil. The method of forming the dielectric layer is not specifically limited, but can be formed by subjecting the metal foil to a chemical formation. In the chemical formation, for example, the metal foil is immersed in a chemical formation solution, such as an ammonium adipate solution, and heat is applied thereto. Alternatively, the metal foil is immersed in a chemical formation solution, and a voltage may be applied thereto.

Prior to forming the dielectric layer, the surface of the metal foil may be roughened, if necessary. The roughening forms irregularities on the surface of the metal foil. The roughening is preferably performed by subjecting the metal foil to an etching treatment. The etching treatment may be carried out by, for example, a direct current electrolytic process or an alternating current electrolytic process.

In addition, as constituent members of the capacitor element, a cathode foil and a separator are prepared, if necessary. The raw material of the cathode foil is, for example, a metal foil containing a valve action metal. A dielectric layer may be formed on a surface of the metal foil used as the cathode foil by the above method, or an electrically conductive coating layer may be formed thereon by sputtering or vapor deposition. Prior to forming the dielectric layer and the coating layer, the surface of the metal foil may be roughened, if necessary. The raw material of the separator is, for example, a fiber structure.

(1-2) Preparation of Cathode Foil

In the case of applying the first conductive polymer dispersion to a cathode foil, a cathode foil is prepared. The cathode foil is as described above. In addition, as constituent members of the capacitor element, the above anode foil and, if necessary, the above separator are prepared.

(2) Step of Preparing First Conductive Polymer Dispersion (S2)

A first conductive polymer dispersion (hereinafter, a first dispersion) containing a first conductive polymer component (hereinafter, a first polymer component) and a first dispersion medium is prepared.

(First Dispersion)

The first dispersion contains a first polymer component and a first dispersion medium.

The content of the first polymer component is not specifically limited. The first polymer component may be contained in an amount of 1 mass % or more and 15 mass % or less in the first dispersion. When the content of the first polymer component is in this range, the viscosity of the first dispersion tends to fall within a range suited to a coating method. Therefore, a sufficient amount of the first polymer component can easily adhere uniformly to the surface of the electrode foil. The content of the first polymer component may be 10 mass % or less, may be 5 mass % or less, and may be 3 mass % or less.

The viscosity of the first dispersion is not specifically limited. The viscosity of the first dispersion as measured at room temperature (20° C.) using a vibration-type viscometer (e.g., VM-100A, available from SEKONIC CORPORATION) may be 10 mPa·s or more. The viscosity of the first dispersion as measured under the above conditions may be 100 mPa·s or more and 200 mPa·s or less. The first dispersion having a viscosity in the range as above is particularly suitable for a coating method.

The first polymer component includes a conductive polymer. Examples of the conductive polymer include polypyrrole, polythiophene, polyfuran, polyaniline, polyacetylene, polyphenylene, polyphenylene vinylene, polyacene, and polythiophene vinylene. These may be used singly or in combination of two or more kinds, and may be a copolymer of two or more kinds of monomers.

In the present specification, the polypyrrole, polythiophene, polyfuran, polyaniline, and the like each mean a polymer whose basic skeleton is polypyrrole, polythiophene, polyfuran, polyaniline, and the like, respectively. The polypyrrole, polythiophene, polyfuran, polyaniline, and the like therefore can include a derivative of each of them. For example, the polythiophene includes poly(3,4-ethylenedioxythiophene) and the like.

The first polymer component may further include a dopant. The dopant may be a polyanion. Specific examples of the polyanion include polyvinyl sulfonic acid, polystyrene sulfonic acid, polyallyl sulfonic acid, polyacrylic sulfonic acid, polymethacrylic sulfonic acid, poly(2-acrylamido-2-methylpropanesulfonic acid), polyisoprene sulfonic acid, and polyacrylic acid. These may be used singly or in combination of two or more kinds. These may be a homopolymer, and may be a copolymer of two or more kinds of monomers. Preferred is a polyanion derived from polystyrene sulfonic acid.

The polyanion included in the first polymer component (hereinafter, the first polyanion) may have any weight average molecular weight. The weight average molecular weight of the first polyanion may be, for example, 1,000 or more and 200,000 or less. The first polymer component including such a first polyanion can be easily dispersed homogeneously in the first dispersion medium, and can easily adhere to the electrode foil. The weight average molecular weight of the first polyanion may be 1,000 or more and 70,000 or less. Even when such a first polyanion is contained in a large amount, the viscosity of the first dispersion is unlikely to increase excessively, and the amount to adhere to the electrode foil tends to increase.

The first polymer component is dispersed, for example, in the form of particles, in the first dispersion medium. The average particle diameter of the first polymer component is not specifically limited, and can be adjusted as appropriate by the polymerization conditions, the dispersion conditions, and the like. The average particle diameter of the first polymer component may be, for example, 0.01 μm or more and 0.5 μm or less. The average particle diameter herein is a median diameter in a volumetric particle size distribution as measured using a particle size meter by a dynamic light scattering technique.

The first dispersion medium is not specifically limited, and may be water, may be a non-aqueous solvent, and may be a mixture thereof. The non-aqueous solvent is a generic term for a liquid other than water, and includes an organic solvent and an ionic liquid. In particular, the first dispersion medium may be water, in terms of the ease of handling and the dispersibility of the conductive polymer component. The water may occupy 50 mass % or more of the first dispersion medium, may occupy 70 mass % or more, and may occupy 90 mass % or more. The non-aqueous solvent used in combination with water is, for example, a polar solvent (protic solvent and/or aprotic solvent).

Examples of the protic solvent include: alcohols, such as methanol, ethanol, propanol, butanol, ethylene glycol (EG), propylene glycol, polyethylene glycol (PEG), diethylene glycol monobutyl ether, glycerin, 1-propanol, butanol, polyglycerin, sorbitol, mannitol, and pentaerythritol; and formaldehyde. Examples of the aprotic solvent include: amides, such as N-methylacetamide, N,N-dimethylformamide, and N-methyl-2-pyrrolidone; esters, such as methyl acetate and γ-butyrolactone (γBL); ketones, such as methyl ethyl ketone; ethers, such as 1,4-dioxane; sulfur-containing compounds, such as dimethyl sulfoxide and sulfolane (SL); and carbonate compounds, such as propylene carbonate.

The first dispersion can be obtained by, for example, dispersing particles of the first polymer component in the first dispersion medium, or allowing polymerization of a precursor monomer of the first polymer component to proceed in the first dispersion medium, to produce particles of the first polymer component in the first dispersion medium.

(3) Step of Forming First Conductive Polymer Layer (S3)

First, the first dispersion is applied to the surface of the electrode foil by a coating method, and then, the first dispersion medium is at least partially removed, to form a first conductive polymer layer (hereinafter, a first polymer layer) containing the first polymer component. By applying the first dispersion onto the electrode foil prior to the fabrication of a capacitor element, the first polymer component can be allowed to adhere in a sufficient amount to the electrode foil. At least part of the first polymer component adheres to the surface of the electrode foil. Part of the first dispersion can permeate into the etch pits on the electrode foil, too. Part of the first dispersion can permeate into the surface and the pores of the dielectric layer of the anode foil, too.

The coating method is a technique for applying a liquid substance onto an object using a coater. The coater may be any known coater, such as a gravure coater, a knife coater, a comma coater, a roll coater, a die coater, and a lip coater. In the present embodiment, the first dispersion is applied to a surface of the electrode foil by any of these known coaters.

The amount of the first dispersion applied onto the electrode foil is not specifically limited. For example, the amount is set as appropriate so that 0.1 mg/cm$^2$ or more of the first polymer component is allowed to adhere to the electrode foil.

The coating treatment with the first dispersion may be performed with respect to one surface or both surfaces of the electrode foil. The coating treatment with the first dispersion may be performed a plurality of times with respect to the same side of the electrode foil. This can increase the thickness of the resultant polymer layer. In this case, a drying treatment may be performed after the coating treatment performed consecutively a plurality of time, or every after one coating treatment.

In view of mass productivity, the step of forming a first polymer layer may be performed with respect to a continuous electrode foil. In the case of performing the coating treatment on both surfaces of the electrode foil being a continuous body, the coating treatment is performed first on one surface, followed by a drying treatment, and then the electrode foil is taken up on a roll. Thereafter, while unrolling the electrode foil from the roll so as to reverse the surface, the coating treatment is performed on the other surface using the same or a different coater.

In the case where a cutting step as described below is performed after the first polymer layer is formed, it is desirable to perform the coating treatment so as not to form a first polymer layer on a line along which the electrode foil is to be cut. This can prevent the first polymer layer from being damaged or separated by cutting, as well as can avoid the first polymer component from adhering to the cut face. In the case of an anode foil, even when subjected to a chemical formation again after the cutting, a uniform dielectric layer is likely to be formed on the cut face.

The first polymer component may be allowed to adhere onto a component member other than the capacitor element, since this can increase the amount of the conductive polymer component. The method of allowing the first polymer component to adhere onto another component member is not specifically limited, which may be a coating method as describe above, or impregnation. Examples of the component member other than the capacitor element include a separator.

The removal of the first dispersion medium may be done by, for example, a drying treatment, such as drying by heating or drying under reduced pressure. The drying conditions are not specifically limited, and can be set as appropriate depending on the kind, the applying amount, and the like of the first dispersion medium. At this time, the drying treatment may be performed to such an extent that the first dispersion medium is not removed completely. For example, the drying treatment may be performed such that the first dispersion immediately after the coating treatment contains the first dispersion medium in an amount of greater than 0 mass % and equal to or less than 10 mass %.

In the case where, the capacitor element is impregnated with a second conductive polymer dispersion (hereinafter, a second dispersion) and/or an electrolyte in a later step, when the first polymer layer contains the first dispersion medium, the second dispersion and/or the electrolyte is likely to be induced by the first dispersion medium, to easily permeate into the etch pits on the electrode foil and further into the pores of the dielectric layer of the anodic foil. Therefore, the capacitance can be expected to increase. Also, the self-repair performance of the anode foil can be expected to improve. In addition, even when a continuous electrode foil with the first polymer layer formed thereon is taken up in a roll form, a crack is unlikely to occur in the first polymer layer.

(4) Step of Cutting Electrode Foil (S4)

The continuous electrode foil with the first polymer layer formed thereon is cut after the step of forming a first polymer layer. In this case, no first polymer layer is on a cut face formed on the electrode foil, that is, the edge face of the electrode foil. Other continuous constituent members also may be cut, for example, in this step. The cutting step may be performed before the step of fabricating a capacitor element, or after the capacitor element is fabricated.

(5) Step of Fabricating Capacitor Element (S5)

The anode foil and the cathode foil are laminated, with the first polymer layer (and the separator) interposed between the anode foil and the cathode foil. The laminate of the anode foil and the cathode foil may be wound. In this case, the end of the cathode foil at the outermost layer is secured with a stopper tape for preventing unwinding. After the cutting step, in order to form a dielectric layer on the cut face of the anode foil, the capacitor element may be further subjected to a chemical formation (chemical reformation).

(6) Step of Impregnating Capacitor Element with Second Conductive Polymer Dispersion (S6)

The capacitor element may be impregnated with the second dispersion containing a second conductive polymer component (hereinafter, a second polymer component) and a second dispersion medium, if necessary. The impregnation method is not specifically limited. After this step, a drying treatment may be performed so that the second dispersion medium is at least partially removed.

By impregnating the capacitor element with the second dispersion and then drying, the second polymer component can adhere to the inside of the capacitor element. With the second polymer component, a further increase in the capacitance, and a reduction in the ESR can be expected. The second polymer component is mainly adhering to the inner surfaces of the pores and the pits of the constituent members of the capacitor element.

(Second Dispersion)

The second dispersion includes, for example, a second polymer component and a second dispersion medium.

Examples of the second dispersion medium are as those used for the first dispersion medium.

The second polymer component is not specifically limited, and may contain a conductive polymer, such as those used in the first polymer component, and a dopant. The second polymer component may contain a polyanion (hereinafter, a second polyanion), as the dopant. The second polyanion preferably has a weight average molecular weight higher than the weight average molecular weight of the first polyanion contained in the first polymer component. In this case, the second polymer component can have a high electrical conductivity, and with a small amount, the ESR can be reduced effectively. Furthermore, the second dispersion also can have a lower viscosity, and the impregnation into the capacitor element can be facilitated.

The weight average molecular weight of the second polyanion may be, for example, 1,000 or more and 200,000 or less, and may be 75,000 or more and 150,000 or less.

In the second dispersion, the content of the second polymer component may be lower than that of the first polymer component in the first dispersion. Specifically, the content of the second polymer component in the second dispersion may be 0.5 mass % or more and below 3 mass %. The viscosity of the second dispersion as measured at room temperature (20° C.) using a vibration-type viscometer is preferably lower than that of the first dispersion as measured under the same conditions. The viscosity of the second dispersion as measured at room temperature (20° C.) using a vibration-type viscometer is preferably below 100 mPa·s.

(7) Step of Impregnating Capacitor Element with Electrolyte (S7)

The capacitor element may be impregnated with an electrolyte, if necessary. The impregnation with the electrolyte may be performed, without performing the impregnation with the second dispersion. After impregnated with the second dispersion, the capacitor element may be further impregnated with an electrolyte. With the electrolyte, the self-repair performance of the dielectric layer can be easily improved. Furthermore, since the electrolyte functions as a substantial cathode material, the capacitance can be expected to increase. The method of impregnation is not specifically limited.

(Electrolyte)

The electrolyte contains a solvent.

The solvent may be a sulfone compound, a lactone compound, a carbonate compound, a polyvalent alcohol, and the like. Examples of the sulfone compound include sulfolane, dimethyl sulfoxide, and diethyl sulfoxide. Examples of the lactone compound include γ-butyrolactone and γ-valerolactone. Examples of the carbonate compound include dimethyl carbonate (DMC), diethyl carbonate (DEC), ethyl methyl carbonate (EMC), ethylene carbonate (EC), propylene carbonate (PC) and fluoroethylene carbonate (FEC). Examples of the polyvalent alcohol include: a glycol compound, such as ethylene glycol (EG), diethylene glycol, triethylene glycol, propylene glycol, and polyethylene glycol (PEG); and glycerin. These may be used singly or in combination of two or more kinds.

In particular, the solvent may include a compound having two or more hydroxy groups. Such a compound is exemplified by a polyvalent alcohol. The content of the compound having two or more hydroxy groups in the whole solvent may be 50 mass % or more, may be 60 mass % or more, and may be 70 mass % or more.

The electrolyte may further contain an acid component. In the case where the first polymer component or the second polymer component contains a dopant, the acid component in the electrolyte can suppress dedoping of the dopant and stabilize the conductivity of each polymer component. Moreover, even when the dopant is dedoped from the polymer component, due to the re-doping of the acid component in the electrolyte into the site from which the dopant has been dedoped, the ESR tends to be kept low.

The acid component in the electrolyte desirably does not cause an excessive increase in the viscosity of the electrolyte, and can be easily dissociated in the electrolyte, to produce an anion that can easily migrate in the solvent. Examples of such an acid component include an aliphatic sulfonic acid having one to 30 carbon atoms, and an aromatic sulfonic acid having six to 30 carbon atoms. The aliphatic sulfonic acid is preferably a monovalent saturated aliphatic sulfonic acid (e.g., hexane sulfonic acid). The aromatic sulfonic acid is preferably an aromatic sulfonic acid having a sulfo group, and in addition, a hydroxy group or a carboxy group, and is exemplified by an oxyaromatic sulfonic acid (e.g., phenolic-2-sulfonic acid), a sulfo aromatic carboxylic acid (e.g., p-sulfobenzoic acid, 3-sulfophthalic acid, 5-sulfosalicylic acid), and the like.

Another example of the acid component is a carboxylic acid. The carboxylic acid preferably includes an aromatic carboxylic acid having two or more carboxyl groups (aromatic dicarboxylic acid). Examples of the aromatic carboxylic acid include phthalic acid (ortho-form), isophthalic acid (meta-form), terephthalic acid (para-form), maleic acid, benzoic acid, salicylic acid, trimellitic acid, and pyromellitic acid. In particular, preferred is an aromatic dicarboxylic acid, such as phthalic acid (ortho-form) and maleic acid. The carboxyl group of the aromatic dicarboxylic acid is stable, and hinders the progress of the side reaction. Therefore, the conductive polymer can be stabilized over a long term, which is advantageous in achieving a longer service life of the electrolytic capacitor. The carboxylic acid may be an aliphatic carboxylic acid, such as adipic acid.

The acid component may include a composite compound of an organic acid and an inorganic acid, in terms of the thermal stability. Examples of the composite compound of an organic acid and an inorganic acid include borodisalicylic acid, borodioxalic acid, and borodiglycolic acid, which are excellent in heat resistance.

The acid component may include an inorganic acid, such as boric acid, phosphoric acid, phosphorous acid, hypophosphorous acid, and phosphonic acid.

In terms of enhancing the effect of suppressing the dedoping phenomenon, the concentration of the acid component may be 5 mass % or more and 50 mass % or less, and may be 15 mass % or more and 35 mass % or less.

The electrolyte may contain a base component in addition to the acid component. The base component neutralizes the acid component at least partially. This can suppress the corrosion of the electrode due to the acid component, while increasing the concentration of the acid component. In view of more effectively suppressing the dedoping phenomenon, the acid component is preferably in excess than the base component, in terms of the equivalent ratio. For example, the equivalent ratio of the acid component to the base component may be 1 or more and 30 or less. The concentration of the base component contained in the electrolyte may be 0.1 mass % or more and 20 mass % or less, and may be 3 mass % or more and 10 mass % or less.

The base component is not specifically limited. Examples of the base component include ammonia, a primary amine, a secondary amine, a tertiary amine, a quaternary ammonium compound, and an amidinium compound. Examples of the amine include an aliphatic amine, an aromatic amine, and a heterocyclic amine.

The electrolyte has a pH of preferably 4 or less, more preferably 3.8 or less, and further more preferably 3.6 or less. By setting the pH of the electrolyte to 4 or less, the deterioration of the polymer component can be further suppressed. The pH is preferably 2.0 or more.

(8) Step of Sealing Capacitor Element (S8)

The fabricated capacitor element is housed in a bottomed case. The bottomed case may be made of a metal, such as aluminum, stainless steel, copper, iron, and brass, or an alloy of these metals. Subsequently, a lateral drawing is applied to the bottomed case near the edge of its opening, and the edge of the opening is bent and crimped onto a sealing member, thereby to seal the capacitor element. A seat plate is then placed at the bent portion, and thus, an electrolytic capacitor is completed. This may be followed by aging under application of a rated voltage.

Although the description is given above by referring to an electrolytic capacitor including a capacitor element in which an anode foil and a cathode foil are laminated and wound, the configuration of the electrolytic capacitor is not limited thereto. In the case where an object to be coated with the first conductive polymer dispersion is the anode foil, the present embodiment can be applied to a laminated electrolytic capacitor including a capacitor element that includes, for example, an anode foil having a dielectric layer, and a cathode leading layer covering the anode foil.

A laminated electrolytic capacitor can be produced, for example, as follows.

In a similar manner to the above, after the first polymer layer is formed on both surfaces of the anode foil (S3), the anode foil is cut into a predetermined shape (S4). In the step (S5) of fabricating a capacitor element, a cathode leading layer is formed so as to cover at least partially the first polymer layer formed on the surface of the anode foil.

The cathode leading layer can be formed by applying a carbon layer material and a metal paste successively, so as to cover the polymer layer, and performing a drying treatment. If necessary, this is followed by the step (S6) of impregnating the capacitor element with a second dispersion and/or the step (S7) of impregnating the capacitor element with an electrolyte. Lastly, the capacitor element is sealed with a resin sealing material using a molding technique, such as injection molding, insert molding, or compression molding. An electrolytic capacitor can be thus obtained.

[Electrolytic Capacitor]

An electrolytic capacitor according to the present embodiment includes a capacitor element including an electrode foil. An conductive polymer layer is formed on the electrode foil. The electrode foil (hereinafter, a coated electrode foil) on which the conductive polymer layer is to be formed may be either an anode foil or a cathode foil, or both an anode foil and a cathode foil. The anode foil has a dielectric layer at its surface. In the coated electrode foil, 90% or more area of its one principal surface is covered with the conductive polymer layer. The conductive polymer layer has a first conductive polymer layer containing a first conductive polymer component, and a second conductive polymer layer partially covering the first conductive polymer layer and containing a second conductive polymer component. By configuring as above, the ESR can be reduced.

Another electrolytic capacitor according to the present embodiment includes a capacitor element which includes an anode foil and a cathode leading layer covering the anode foil. The anode foil has a dielectric layer. A conductive polymer layer is formed on the anode foil. The cathode leading layer is formed so as to cover the conductive polymer layer at least partially. In the anode foil, 90% or more area of its one principal surface is covered with the conductive polymer layer. The conductive polymer layer includes a first conductive polymer layer containing a first conductive polymer component, and a second conductive polymer layer partially covering the first conductive polymer layer and containing a second conductive polymer component.

When the coated electrode foil is viewed in the direction normal to its one principal surface, 90% or more area of its principal surface is covered with the conductive polymer layer. The conductive polymer layer includes the above first polymer layer and the above second conductive polymer layer (hereinafter, the second polymer layer). The area coverage with the conductive polymer layer is preferably 95% or more. The conductive polymer layer may be continuous on the surface of the coated electrode foil or discontinuous. The area coverage is calculated using the coated electrode foil cut in a predetermined size for use in an electrolytic capacitor. The area coverage may be calculated by binarizing an image obtained by photographing the principal surface of the coated electrode foil.

The area coverage with the conductive polymer layer can be regarded as the area coverage with the first polymer layer. This is because the area coverage of the coated electrode foil with the second polymer layer is smaller than that with the first polymer layer. The area coverage with the second polymer layer is, for example, 90% or less, and may be 60% or less.

A description will be given below of the constituent members of the capacitor element and other constituent members.

(First Polymer Layer)

The first polymer component can adhere to the inner walls of the etch pits of the coated electrode foil and also to the outer surfaces of the etch pits. In other words, the first polymer layer is formed so as to cover the surface of the coated electrode foil at least partially. The first polymer layer can be easily formed when the first dispersion is applied by a coating method. As least part of the first polymer layer is disposed between the coated electrode foil and the separator or between the coated electrode foil and the other electrode foil. The first polymer layer may not be formed on the edge face of the coated electrode foil.

The mass of the first polymer layer per unit area of the coated electrode foil is not specifically limited, and can be set appropriately as needed. According to the present embodiment, the first polymer layer can be allowed to adhere in a mass of 0.1 mg/cm$^2$ or more per unit area of the coated electrode foil. The above mass of the first polymer layer may be 1 mg/cm$^2$ or less. This can effectively suppress the reduction in the withstand voltage of the resultant electrolytic capacitor.

The above mass of the first polymer layer can be calculated from the difference in the mass of the electrode foil before and after the application of the first dispersion. Also, the mass of the first polymer layer can be calculated by analyzing the coated electrode foil by a thermogravimetric analysis (TGA method). The TGA method measures, for example, the change in thermal profile, the weight loss, and the like of a sample when the temperature of the sample is raised at a constant rate. Based on the measured value, the mass of the first polymer layer adhering to the coated electrode foil can be calculated.

The higher the electrical conductivity of the first polymer layer is, the more effectively the ESR can be reduced. The electrical conductivity of the first polymer layer may be, for example, 30 S/cm or more, and may be 300 S/cm or more. The electrical conductivity of the first polymer layer tends to increase with an increase in the molecular weight of the conductive polymer contained. Increasing the molecular weight of the conductive polymer, however, tends to raise the viscosity of the first dispersion. Therefore, the molecular weight of the conductive polymer is set so as not to excessively raise the viscosity of the first dispersion.

In the case of using the first dispersion having a first polymer component concentration of 3 mass % or more, the electrical conductivity of the first polymer layer is preferably set to, for example, 170 S/cm or less. This can suppress an excessive rise in viscosity of the first dispersion. In the above case, the electrical conductivity of the first polymer layer may be 150 S/cm or less, and may be 120 S/cm or less. The electrical conductivity of the first polymer layer is an electrical conductivity of a film obtained by applying the first dispersion to a base material, and then removing the first dispersion medium. The electrical conductivity of the film can be measured by a four-point probe method in accordance with JIS K 7194:1994.

(Second Polymer Layer)

The second polymer layer described above is disposed in the capacitor element. With the second polymer layer, a further increase in the capacitance and a further reduction in the ESR can be expected. The second polymer layer can be disposed by, for example, impregnating the capacitor element with the second dispersion.

The second polymer component can adhere to the inner surfaces of the pores and the pits of the constituent members of the capacitor element. The second polymer component also adheres to the surface of the coated electrode foil so as to cover at least partially the first polymer layer formed on the surface of the coated electrode foil.

The second polymer layer is adhering in an amount of, for example, 0.01 mg/cm$^2$ or more and 1 mg/cm$^2$ or less in the capacitor element. The adhesion amount of the second polymer layer can be calculated similarly to calculating that of the first polymer layer. In the case of analyzing the coated electrode foil using a TGA method, first, the adhesion amount of the first polymer layer is subtracted from the calculated adhesion amount, to give an amount of the second polymer layer having adhered to the coated electrode foil. Then, the amount of the second polymer layer having adhered to other constituent members (e.g., the other electrode foil and/or the separator) is calculated using a TGA method, and the calculated amount and the amount of the second polymer layer having adhered to the coated electrode foil are summed up. The obtained sum is an amount of the second polymer layer adhering to the capacitor element. By dividing the sum amount of the adhering second polymer layer by the sum of the areas of the one principal surfaces of the constituent members, the mass of the second polymer layer adhering per unit area of the capacitor element can be determined.

The mass (density) of the first polymer layer adhering per unit area of the coated electrode foil is preferably greater than that of the second polymer layer adhering per unit area of the coated electrode foil. The ratio of the density of the first polymer layer to the density of the second polymer layer can be determined by observing a cross section of the coated electrode foil using a scanning electron microscope (SEM) or the like. The above ratio of the density of the first polymer layer to the density of the second polymer layer can be calculated by dividing the area of the first polymer layer in contact with the electrode foil by the area of the polymer layer other than the first polymer layer. The densities of the both layers can be calculated by observing the same coated electrode foil within the same observation field of view. Normally, the first polymer layer and the second polymer layer can be identified one from the other because an interface can be observed between these layers. The adhesion amount, the area coverage, the density, etc. of the first polymer layer are calculated, excluding a region of the coated electrode foil where the first polymer layer is not intentionally formed. The size of the observation field of view is preferably set to 100 μm$^2$ or more.

(Anode Foil)

The anode foil is a metal foil containing at least one valve action metal, such as titanium, tantalum, aluminum, and niobium. The anode foil may contain the valve action metal in a form of an alloy containing the valve action metal or a compound containing the valve action metal. The anode foil may have any thickness, and may be, for example, 15 μm or more and 300 μm or less thick. The thickness is an average of the thicknesses at any five points (the same applies hereinafter). A surface of the anode foil may be roughened by etching or the like.

The anode foil has a dielectric layer at its surface. The dielectric layer is formed by, for example, subjecting the anode foil to a chemical formation. In this case, the dielectric layer can include an oxide of a valve action metal. The dielectric layer, however, is not limited thereto, and may be in any form that functions as a dielectric. Desirably, the dielectric layer is formed also on the edge face of the anode foil.

(Cathode Foil)

The cathode foil may be anything which functions as a cathode, and is not specifically limited. The cathode foil may be a metal foil. The metal may be of any kind, and as in the case of the anode foil, a valve action metal or an alloy containing a valve action metal may be used. The cathode foil may have any thickness, and may be, for example, 15 µm or more and 300 µm or less thick. A surface of the cathode foil may be roughened as needed or may be subjected to a chemical formation.

When the metal foil contains a valve action metal, the metal foil may have an electrically conductive coating layer containing at least one selected from the group consisting of carbon and a metal having an ionization tendency lower than the valve action metal. In this case, the acid resistance tends to improve. When the metal foil contains aluminum, the coating layer may contain at least one selected from the group consisting of carbon, nickel, titanium, tantalum, and zirconium. In particular, in terms of the cost and the resistance, the coating layer may contain nickel and/or titanium.

The coating layer may have any thickness. The thickness of the coating layer may be, for example, 5 nm or more and 200 nm or less, and may be 10 nm or more and 200 nm or less. The thickness of the coating layer can be measured by, for example, an X-ray photoelectron spectroscopy (XPS method). The coating layer can be formed by, for example, vapor-depositing or sputtering the metal onto a metal foil. Alternatively, the coating layer can be formed by vapor-depositing an electrically conductive carbon material or applying a carbon paste containing an electrically conductive carbon material onto a metal foil. Examples of the conductive carbon material include graphite, hard carbon, soft carbon, and carbon black.

(Separator)

In the case of laminating a plurality of electrode foils, a separator may be interposed, together with the first polymer layer, between the electrodes. When the first polymer layer having a sufficient thickness is interposed between the electrodes, the separator may be omitted.

The separator is not specifically limited as long as it is porous. The separator may be a fiber structure, such as a woven fabric, knitted fabric, or nonwoven fabric, containing fibers. The separator has any thickness, and may be, for example, 10 to 300 µm thick.

The separator may be made of any material. Examples of the material of the separator include: synthetic fibers, such as nylon fibers, aramid fibers, acrylic fibers, and polyester fibers; and cellulose. In particular, a fiber structure made of cellulose can be suitably used as a separator, in terms of its low cost and good affinity with the first dispersion.

The cellulose, which has a hydroxyl group, however, is prone to swell with water. Therefore, the separator made of cellulose, when coming in contact with the first dispersion, tends to have wrinkles. In view of preventing wrinkles, the separator may contain a synthetic fiber, and may contain a paper reinforcing agent together with cellulose fibers. Less wrinkles in the separator can lead to a uniform thickness of the separator. Therefore, the withstand voltage and the resistance between electrodes can be prevented from varying from place to place in the electrolytic capacitor.

In a fiber structure containing a synthetic fiber (hereinafter, a first fiber structure), the content of the synthetic fiber may be 50 mass % or more of the fiber structure, and may be 70 mass % or more. The synthetic fiber may be of any kind.

The first fiber structure may further contain cellulose, in terms of its good affinity with the first dispersion and with the second dispersion and the electrolyte that are further added as needed. The content of the cellulose may be 10 mass % or more of the fiber structure, in view of the retention of the electrolyte. The content of the cellulose may be below 50 mass %, may be 30 mass % or less, and may be 20 mass % or less.

In a fiber structure containing a paper reinforcing agent in addition to the cellulose fibers (hereinafter, a second fiber structure), the paper reinforcing agent may be of any kind, and may be a wet paper reinforcing agent and/or a dry paper reinforcing agent. These may be used singly or in combination. The wet paper reinforcing agent may be, for example, at least one selected from the group consisting of urea formaldehyde resin, melamine formaldehyde resin, polyamide polyamine epichlorohydrin, and polyvinylamine. The dry paper reinforcing agent may be, for example, at least one selected from the group consisting of polyacrylamide, polyvinyl alcohol, starch, and carboxymethyl cellulose.

The paper reinforcing agent may be added to a raw material of the second fiber structure (e.g., a cellulose fiber-containing slurry), or may be applied to the second fiber structure by spraying or the like.

In the case of adding a paper reinforcing agent, the content of the cellulose in the second fiber structure may be 40 mass % or more, and may be 70 mass % or more. The second fiber structure may further contain a synthetic fiber. The content of the synthetic fiber in the second fiber structure may be, for example, 10 mass % or more and 60 mass % or less.

The fiber structure may have any density. Even when the fiber structure has a low density, by containing a synthetic fiber in an amount of 50 mass % or more or by containing a paper reinforcing agent in combination with cellulose fibers, the swelling of the fiber structure with the first dispersion can be suppressed. The density of the fiber structure is, for example, 0.2 g/cm$^3$ or more and below 0.45 g/cm$^3$, and may be 0.25 g/cm$^3$ or more and 0.40 g/cm$^3$ or less.

The fiber structure may have any thickness. The thickness of the fiber structure may be, for example, 20 µm or more and 100 µm or less, and is preferably 30 µm or more and 60 µm or less. In this case, a short circuit in the resultant electrolytic capacitor can be easily suppressed, and the ESR can be more effectively reduced.

(Cathode Leading Layer)

The cathode leading layer includes, for example, a carbon layer formed so as to cover the polymer layer, and a metal paste layer formed on a surface of the carbon layer. The carbon layer includes an electrically conductive carbon material, such as graphite, and a resin. The metal paste layer includes, for example, metal particles (e.g., silver) and a resin. The configuration of the cathode leading layer is not limited thereto. The cathode leading layer may have any configuration that has a current collecting function.

(Resin Sealing Material)

The resin sealing material includes, for example, a thermosetting resin. Examples of the thermosetting resin include epoxy resin, phenol resin, silicone resin, melamine resin, urea resin, alkyd resin, polyurethane, polyimide, and unsaturated polyester. The outer case material may include a filler, a curing agent, a polymerization initiator, and/or a catalyst.

Figure 2:
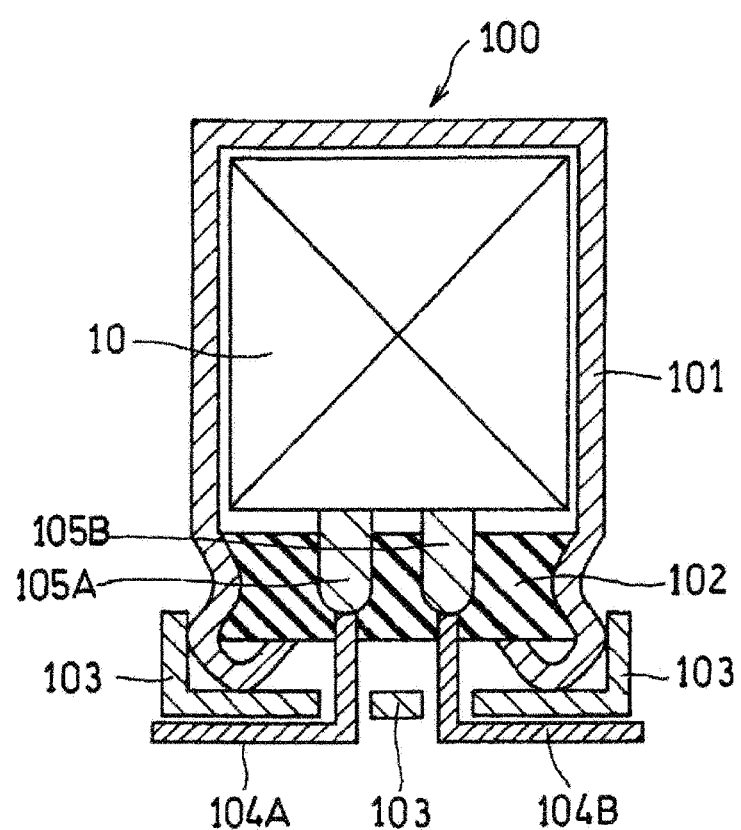
FIG. 2 A schematic cross-sectional view of an example of an electrolytic capacitor according to an embodiment of the present invention.
Figure 3:
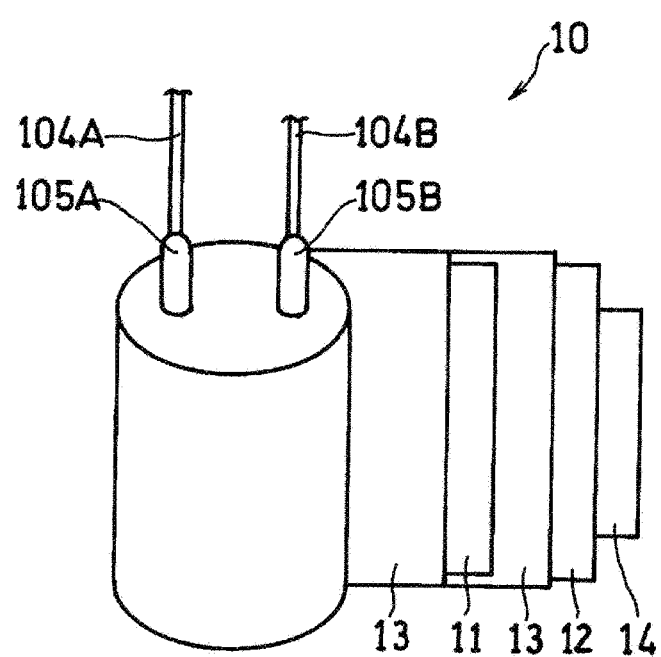
FIG. 3 A schematic partially exploded oblique view of a capacitor element according to an embodiment of the present invention.

FIG. 2 is a schematic cross-sectional view of an example of an electrolytic capacitor (wound electrolytic capacitor) according to the present embodiment. FIG. 3 is a schematic partially exploded oblique view of a capacitor element according to the electrolytic capacitor.

The electrolytic capacitor includes, for example, a capacitor element 10, a bottomed case 101 housing the capacitor element 10, a sealing member 102 closing the opening of the bottomed case 101, a seat plate 103 covering the sealing member 102, lead wires 104A and 104B extending outward from the sealing member 102 and passing through the seat plate 103, and lead tabs 105A and 105B connecting the lead wires to electrodes of the capacitor element 10. The bottomed case 101 is drawn inward near the edge of the opening, and the edge of the opening is bent and crimped onto the sealing member 102.

The capacitor element 10 is, for example, a wound body as shown in FIG. 3. The wound body includes an anode foil 11 connected to the lead tab 105A, a cathode foil 12 connected to the lead tab 105B, and a separator 13. At least one of the anode foil 11 and the cathode foil 12 has the first polymer layer (not shown) and further has the second polymer layer.

The anode foil 11 and the cathode foil 12 are wound, with the separator 13 interposed therebetween. The outermost layer of the wound body is secured with a stopper tape 14. FIG. 3 shows the capacitor element in a partially exploded state before the outermost layer of the wound body is secured.

The electrolytic capacitor has at least one capacitor element, and may have a plurality of capacitor elements. The number of capacitor elements included in the electrolytic capacitor may be determined depending on its use.

EXAMPLES

The present invention will be more specifically described below with reference to Examples. It is to be noted, however, that the present invention is not limited to Examples.

Example 1

An electrolytic capacitor having a rated voltage of 35 V was produced in the following manner.
(a) Preparation of Constituent Members A 100-μm-thick aluminum foil was subjected to an etching treatment, to roughen a surface of the aluminum foil. The roughened surface of the aluminum foil was subjected to a chemical formation, to form a dielectric layer. An anode foil was thus obtained.

A 50-μm-thick aluminum foil was subjected to an etching treatment, to roughen a surface of the aluminum foil. A cathode foil was thus obtained.

A 50-μm-thick nonwoven fabric was prepared as a raw material for the separator. The nonwoven fabric was composed of 50 mass % of a synthetic fiber (polyester fiber: 25 mass %, aramid fiber: 25 mass %) and 50 mass % of cellulose, and contained polyacrylamide as a paper reinforcing agent. The density of the nonwoven fabric was 0.35 g/cm$^3$.
(b) Preparation of First Dispersion First, 3,4-ethylenedioxythiophene and polystyrene sulfonic acid (PSS, weight average molecular weight: 100,000) were dissolved in ion-exchanged water, to prepare a mixed solution. Then, iron sulfate (III) (oxidant) was added to the mixed solution under stirring, to allow polymerization to proceed. The reaction solution was then dialyzed to remove the unreacted monomer and oxidant. A first dispersion containing polyethylene dioxythiophene doped with about 5 mass % of PSS (dopant) (PEDOT/PSS, first polymer component) was thus obtained.

The concentration of the first polymer component in the first dispersion was 2 mass %. The viscosity of the first dispersion as measured at room temperature (20° C.) using a vibration-type viscometer (VM-100A, available from SEKONIC CORPORATION) was 40 mPa·s.
(c) Formation of First Polymer Layer The first dispersion was applied to both surfaces of the anode foil using a gravure coater. This was followed by a drying treatment, to form a first polymer layer on both surfaces of the anode foil. The mass per unit area of the first polymer layer formed on the anode foil was 0.3 mg/cm$^2$. The area coverage with the first polymer layer of one principal surface of the anode foil was 99%. The conductivity of the first polymer layer was 400 S/cm.
(d) Fabrication of Capacitor Element The anode foil, the cathode foil, and the separator were each cut in a predetermined size.

An anode lead tab and a cathode lead tab were connected to the anode foil and the cathode foil, respectively, and the anode foil and the cathode foil were wound together with the lead tabs, with the separator interposed therebetween. An anode lead wire and a cathode lead wire were connected to the corresponding lead tabs extending from the wound body. The resultant wound body was subjected again to a chemical formation, to form a dielectric layer on the edge face of the anode foil. The end of the outer surface of the wound body was secured with a stopper tape. A capacitor element was thus obtained.
(e) Preparation of Second Dispersion and Formation of Second Polymer Layer First, 3,4-ethylenedioxythiophene and polystyrene sulfonic acid (PSS, weight average molecular weight: 100,000) were dissolved in ion-exchanged water, to prepare a mixed solution. Then, iron sulfate (III) (oxidant) was added to the mixed solution under stirring, to allow polymerization to proceed. The reaction solution was then dialyzed to remove the unreacted monomer and oxidant. A second dispersion containing polyethylenedioxythiophene doped with about 5 mass % of PSS (dopant) (PEDOT/PSS, second polymer component) was thus obtained.

The concentration of the second polymer component in the second dispersion was 1.5 mass %. The viscosity of the second dispersion as measured at room temperature (20° C.) using a vibration-type viscometer (VM-100A, available from SEKONIC CORPORATION) was 30 mPa·s.

The capacitor element was immersed in the second dispersion for five minutes in a reduced pressure atmosphere (40 kPa), and then subjected to a drying treatment, to form a second polymer layer.
(f) Impregnation with Electrolyte Ethylene glycol (EG) was prepared as a solvent. In the EG, 5-sulfosalicylic acid (divalent acid component) serving as a second sulfonic acid and triethylamine serving as a base component were dissolved at a total concentration of 25 mass %, to prepare an electrolyte. The equivalent ratio of the 5-sulfosalicylic acid to the triethylamine was set to 2.0.

After the impregnation (e) with the second dispersion, the capacitor element was immersed in the electrolyte for five minutes in a reduced pressure atmosphere (40 kPa).
(g) Sealing of Capacitor Element The capacitor element impregnated with the electrolyte was sealed, to complete an electrolytic capacitor (A1) as illustrated in FIG. 2. Thereafter, aging was performed at 95° C. for 90 minutes under application of a rated voltage.

<Evaluation>

The electrolytic capacitor A1 was evaluated for its capacitance and ESR after aging (measurement temperature: 20° C.). The evaluation results are shown as relative values to the capacitance and ESR of an electrolytic capacitor B1 produced in Comparative Example 1.

After the measurement of the capacitance and ESR, the electrolytic capacitor A1 was disassembled, to take out the constituent members. The mass per unit area of the second polymer layer in the whole capacitor element was 0.07 mg/cm$^2$. The area coverage with the second polymer layer of one principal surface of the anode foil was 83%.

Example 2

An electrolytic capacitor A2 was produced and evaluated in the same manner as in Example 1, except that in the formation (c) of the first polymer layer, the first dispersion was applied to both surfaces of each of the anode foil and the cathode foil, using a gravure coater. The results are shown in Table 1. The mass per unit area of the first polymer layer formed on each of the anode foil and the cathode foil was 0.3 mg/cm$^2$. The area coverage with the first polymer component of one principal surface of each of the anode foil and the cathode foil was 99%.

Example 3

An electrolytic capacitor A3 was produced and evaluated in the same manner as in Example 1, except that in the formation (c) of the first polymer layer, the first dispersion was applied to both surfaces of each of the anode foil and the separator, using a gravure coater. The results are shown in Table 1. The mass per unit area of the first polymer layer formed on the anode foil was 0.3 mg/cm$^2$, and that on the separator was 0.02 mg/cm$^2$. The area coverage with the first polymer layer of one principal surface of the anode foil was 99%, and that of the separator was 98%.

Example 4

A first dispersion was prepared in the same manner as in Example 1, except that a PSS having a weight average molecular weight of 50,000 was used. The concentration of the first polymer component in the first dispersion was 4 mass %. The viscosity of the first dispersion as measured at room temperature (20° C.) using a vibration-type viscometer (VM-100A, available from SEKONIC CORPORATION) was 105 mPa·s.

An electrolytic capacitor A4 was produced and evaluated in the same manner as in Example 1, except that the above first dispersion was used. The results are shown in Table 1. The mass per unit area of the first polymer layer formed on the anode foil was 0.4 mg/cm$^2$. The area coverage with the first polymer layer of one principal surface of the anode foil was 99%. The conductivity of the first polymer layer was 150 S/cm.

Comparative Example 1

An electrolytic capacitor B1 was produced and evaluated in the same manner as in Example 1, except that the formation (c) of the first polymer layer was not performed. The results are shown in Table 1.

TABLE 1

| Electrolytic capacitor | Capacitance | ESR |
|---|---|---|
| A1 | 1.01 | 0.94 |
| A2 | 1.02 | 0.92 |
| A3 | 1.01 | 0.94 |
| A4 | 1.01 | 0.93 |
| B1 | 1 | 1 |

Example 5

An electrolytic capacitor A5 was produced and evaluated in the same manner as in Example 1, except that in the formation (c) of the first polymer layer, the first dispersion was applied to both surfaces of the cathode foil, instead of the anode foil, using a gravure coater. The results are shown in Table 2. The mass per unit area of the first polymer layer adhering to the cathode foil was 0.3 mg/cm$^2$. The area coverage with the polymer layer of one principal surface of the cathode foil was 99%.

Example 6

An electrolytic capacitor A6 was produced and evaluated in the same manner as in Example 1, except that in the formation (c) of the first polymer layer, the first dispersion was applied to both surfaces of each of the cathode foil and the separator, instead of the anode foil, using a gravure coater. The results are shown in Table 2. The mass per unit area of the first polymer layer formed on the cathode foil was 0.3 mg/cm$^2$, and that on the separator was 0.02 mg/cm$^2$. The area coverage with the first polymer layer of one principal surface of the cathode foil was 99%, and that of the separator was 98%.

Example 7

An electrolytic capacitor A7 was produced and evaluated in the same manner as in Example 5, except that the first dispersion prepared in Example 4 was used. The results are shown in Table 2. The mass per unit area of the first polymer layer formed on the cathode foil was 0.4 mg/cm$^2$. The area coverage with the first polymer layer of one principal surface of the cathode foil was 99%.

TABLE 2

| Electrolytic capacitor | Capacitance | ESR |
|---|---|---|
| A5 | 1.02 | 0.93 |
| A2 | 1.02 | 0.92 |
| A6 | 1.02 | 0.93 |
| A7 | 1.03 | 0.92 |
| B1 | 1 | 1 |

INDUSTRIAL APPLICABILITY

The present invention is suitably applicable to an electrolytic capacitor in which a high ripple current flows.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

100: electrolytic capacitor
101: bottomed case
102: sealing member
103: seat plate
104A, 104B: lead wire
105A, 105B: lead tab
10: capacitor element
11: anode foil
12: cathode foil
13: separator
14: stopper tape

The invention claimed is:

1. A method for producing an electrolytic capacitor, the method comprising steps of:
preparing first and second electrode foils and a separator;
preparing a first conductive polymer dispersion containing a first conductive polymer component and a first dispersion medium;
preparing a second conductive polymer dispersion containing a second conductive polymer component and a second dispersion medium;
forming a first conductive polymer layer containing the first conductive polymer component, by applying the first conductive polymer dispersion to a surface of the first electrode foil by a coating method, and then at least partially removing the first dispersion medium;
fabricating a capacitor element, by interposing the separator between the first electrode foil having the first conductive polymer layer and the second electrode foil; and
impregnating the fabricated capacitor element with the second conductive polymer dispersion, wherein:
the first electrode foil is a continuous body, and
the method includes, after the step of forming a first conductive polymer layer and before the step of fabricating a capacitor element, a step of cutting the first electrode foil.

2. The method for producing an electrolytic capacitor according to claim 1, wherein
a content of the first conductive polymer component in the first conductive polymer dispersion is 1 mass % or more and 15 mass % or less, and
a viscosity of the first conductive polymer dispersion as measured at room temperature using a vibration-type viscometer is 10 mPa·s or more.

3. The method for producing an electrolytic capacitor according to claim 1, wherein:
the first conductive polymer component includes a first polyanion, and
the first polyanion has a weight average molecular weight of 1,000 or more and 70,000 or less.

4. The method for producing an electrolytic capacitor according to claim 1, wherein the method includes a step of impregnating the fabricated capacitor element with an electrolyte, after impregnating the fabricated capacitor element with the second conductive polymer dispersion.

5. The method for producing an electrolytic capacitor according to claim 4, wherein the electrolyte contains a solvent and an acid component.

6. The method for producing an electrolytic capacitor according to claim 4, wherein the electrolyte contains a solvent having two or more hydroxy groups.

7. The method for producing an electrolytic capacitor according to claim 1, wherein the first electrode foil is an anode foil having a dielectric layer.

8. The method for producing an electrolytic capacitor according to claim 1, wherein the second electrode foil is a cathode foil.

9. The method for producing an electrolytic capacitor according to claim 8, wherein:
the cathode foil prepared in the step of preparing a cathode foil has a metal foil and a coating layer with electrical conductivity formed on the metal foil, the metal foil containing a valve action metal, and
the coating layer contains at least one selected from the group consisting of a carbon and a metal having an ionization tendency lower than the valve action metal.

10. A method for producing an electrolytic capacitor, the method comprising steps of:
preparing first and second electrode foils and a separator;
preparing a first conductive polymer dispersion containing a first conductive polymer component and a first dispersion medium;
preparing a second conductive polymer dispersion containing a second conductive polymer component and a second dispersion medium;
forming a first conductive polymer layer containing the first conductive polymer component, by applying the first conductive polymer dispersion to a surface of the first electrode foil by a coating method, and then at least partially removing the first dispersion medium;
fabricating a capacitor element, by interposing the separator between the first electrode foil having the first conductive polymer layer and the second electrode foil; and
impregnating the fabricated capacitor element with the second conductive polymer dispersion,
wherein:
a content by mass of the second conductive polymer component in the second conductive polymer dispersion is smaller than the content by mass of the first conductive polymer component in the first conductive polymer dispersion, and
a viscosity of the second conductive polymer dispersion as measured at room temperature using a vibration-type viscometer is lower than a viscosity of the first conductive polymer dispersion as measured under the same conditions.

11. A method for producing an electrolytic capacitor, the method comprising steps of:
preparing first and second electrode foils and a separator;
preparing a first conductive polymer dispersion containing a first conductive polymer component and a first dispersion medium;
preparing a second conductive polymer dispersion containing a second conductive polymer component and a second dispersion medium;
forming a first conductive polymer layer containing the first conductive polymer component, by applying the first conductive polymer dispersion to a surface of the first electrode foil by a coating method, and then at least partially removing the first dispersion medium;
fabricating a capacitor element, by interposing the separator between the first electrode foil having the first conductive polymer layer and the second electrode foil; and impregnating the fabricated capacitor element with the second conductive polymer dispersion, wherein in the step of forming the first conductive polymer layer, the first dispersion medium is partially removed, to form the first conductive polymer layer containing the first conductive polymer component and the first dispersion medium.

12. A method for producing an electrolytic capacitor, the method comprising steps of:

preparing first and second electrode foils and a separator;

preparing a first conductive polymer dispersion containing a first conductive polymer component and a first dispersion medium;

preparing a second conductive polymer dispersion containing a second conductive polymer component and a second dispersion medium;

forming a first conductive polymer layer containing the first conductive polymer component, by applying the first conductive polymer dispersion to a surface of the first electrode foil by a coating method, and then at least partially removing the first dispersion medium;

fabricating a capacitor element, by interposing the separator between the first electrode foil having the first conductive polymer layer and the second electrode foil; and impregnating the fabricated capacitor element with the second conductive polymer dispersion, wherein:

the first electrode foil is an anode foil having a dielectric layer, the anode foil is a continuous body, and the method includes, after the step of forming a first conductive polymer layer, a step of cutting the anode foil, and forming a dielectric layer on a cut face formed by cutting.

13. An electrolytic capacitor, comprising:

a capacitor element including a first electrode foil, a second electrode foil, and a separator interposed therebetween, wherein a first conductive polymer layer containing a first conductive polymer component is formed on the first electrode foil, 90% or more area of one principal surface of the first electrode foil is covered with the first conductive polymer layer, a capacitor element is impregnated with a second conductive polymer component, and a second conductive polymer layer at least partially covering the first conductive polymer layer and containing the second conductive polymer component is formed on the first conductive polymer layer, and the first conductive polymer layer is not formed on an edge face of the first electrode foil.

14. The electrolytic capacitor according to claim 13, wherein the first conductive polymer layer has a mass per unit area of 0.1 mg/cm$^2$ or more.

15. The electrolytic capacitor according to claim 13, wherein the first conductive polymer layer has an electrical conductivity of 170 S/cm or less.

16. The electrolytic capacitor according to claim 13, wherein the first electrode foil is an anode foil having a dielectric layer.

17. The electrolytic capacitor according to claim 16, wherein the dielectric layer is further formed on an edge face of the anode foil.

18. The electrolytic capacitor according to claim 13, wherein the first electrode foil is a cathode foil.

19. An electrolytic capacitor, comprising:

a capacitor element including a first electrode foil, a second electrode foil, and a separator interposed therebetween, wherein a first conductive polymer layer containing a first conductive polymer component is formed on the first electrode foil, 90% or more area of one principal surface of the first electrode foil is covered with the first conductive polymer layer, and a capacitor element is impregnated with a second conductive polymer component, and a second conductive polymer layer at least partially covering the first conductive polymer layer and containing the second conductive polymer component is formed on the first conductive polymer layer, wherein the first conductive polymer component contains a first polyanion, the second conductive polymer component contains a second polyanion, and a weight average molecular weight of the second polyanion is higher than a weight average molecular weight of the first polyanion.

* * * * *